United States Patent
Evans et al.

(10) Patent No.: US 6,629,025 B2
(45) Date of Patent: Sep. 30, 2003

(54) SURGE SUPPRESSION CONTROL FOR A MOTOR VEHICLE DRIVETRAIN

(75) Inventors: David Gordon Evans, Rochester, MI (US); James J. Paris, River Forest, IL (US); Gerald Thomas Fattic, Fishers, IN (US)

(73) Assignees: General Motors Corporation, Detroit, MI (US); Delphi Technologies Inc., Troy, MI (US)

( * ) Notice: Subject to any disclaimer, the term of this patent is extended or adjusted under 35 U.S.C. 154(b) by 32 days.

(21) Appl. No.: 10/038,155

(22) Filed: Jan. 3, 2002

(65) Prior Publication Data

US 2003/0125850 A1 Jul. 3, 2003

(51) Int. Cl.$^7$ ............................................. B60L 11/00
(52) U.S. Cl. ...................... 701/22; 701/51; 123/192.1; 477/97
(58) Field of Search ............................ 701/22, 51, 54; 477/41, 97, 102, 109, 3; 123/192.1; 310/51; 307/9.1, 131, 10.1, 10.7; 361/1, 4

(56) References Cited

U.S. PATENT DOCUMENTS

| | | | |
|---|---|---|---|
| 4,703,428 A | * 10/1987 | Hosaka et al. | ............... 701/54 |
| 5,185,543 A | 2/1993 | Tebbe | ........................... 310/51 |
| 5,573,474 A | 11/1996 | Marsh et al. | ................. 477/9.1 |
| 5,669,354 A | 9/1997 | Morris | ................... 123/406.24 |
| 5,730,094 A | 3/1998 | Morris | .................... 123/192.1 |
| 6,377,882 B1 | * 4/2002 | Ito | .............................. 701/51 |

* cited by examiner

Primary Examiner—Marthe Y. Marc-Coleman
(74) Attorney, Agent, or Firm—Christopher DeVries

(57) ABSTRACT

An improved surge suppression control for a motor vehicle drivetrain detects and suppresses drivetrain oscillation in a predetermined range of frequencies centered on an estimate of the natural frequency of the drivetrain. The drivetrain natural frequency is determined based on the current speed ratio of the vehicle transmission and empirically determined vehicle characteristics, and is used to define the center frequency of a band-pass filter responsive to engine speed. The filter output represents the AC component of the engine speed in a range of frequencies centered on the driveline natural frequency, and such component is differentiated to form an acceleration component in phase synchronism with the torque causing the detected resonance. An electric machine mechanically coupled to the engine is energized in accordance with the inverse of the acceleration component to actively cancel the detected resonance whenever the acceleration component exceeds a noise threshold that also is adjusted based on the estimated natural frequency of the drivetrain.

5 Claims, 2 Drawing Sheets

SURGE SUPPRESSION CONTROL FOR A MOTOR VEHICLE DRIVETRAIN

TECHNICAL FIELD

This invention relates to the control of a motor vehicle drivetrain including an electrical machine, and more particularly to a control of the electrical machine for suppressing drivetrain oscillations referred to as surge.

BACKGROUND OF THE INVENTION

It is well known that the combined components of a motor vehicle drivetrain (driveshaft, differential gearset, propshafts, suspension, tires, etc.) exhibit a characteristic torsional natural frequency, and that such components can be excited in a resonant mode, due to driver requested power changes, transmission shifting, irregular engine combustion or road disturbances. This phenomenon is sometimes referred to as surge or chuggle, and typically occurs in a frequency range of 1 Hz to 12 Hz, depending on the combined stiffness of the various drivetrain components. Unfortunately, the tendency of a vehicle to experience surge is significantly increased in high-efficiency operating modes, such as when the engine is operated at low speed and high load.

For obvious reasons, drivetrain surge is highly undesirable, and various approaches, both mechanical and electrical, have been proposed for mitigating its effects. See, for example, the U.S. Pat. No. 5,185,543 to Tebbe and U.S. Pat. No. 5,730,094 to Morris. In Tebbe '543, a torsional vibration damper is coupled to a motor vehicle drivetrain; this tends to change the natural frequency of the drivetrain, making it less subject to resonant ringing. In Morris '094, on the other hand, the field current of an engine-driven alternator is controlled to actively dampen a detected oscillation of the drivetrain by presenting a variable load torque to the engine. Morris '094 also discusses active control of engine spark timing for the same purpose, as do the U.S. Pat. No. 5,669,354 to Morris and U.S. Pat. No. 5,573,474 to Marsh et al.

A common thread in the various electrical approaches mentioned above is that the suppression control is triggered into operation when the engine speed deviates from a steady value by more than a certain amount. For example, in the '543 patent, the active damping control is initiated when the measured engine speed exceeds a reference engine speed by more than a dead band threshold such as ±5RPM. However, the engine speed is a complex waveform containing a variety of high and low frequency components, many of which cannot be perceived by the vehicle occupants and, therefore, need not be suppressed. Furthermore, the frequency response of the electrical control may severely limit its ability to actively dampen or cancel many of the detected frequency components.

SUMMARY OF THE INVENTION

The present invention is directed to a surge suppression control for a motor vehicle drivetrain, having an improved method of detecting and responding to drivetrain oscillation at the natural frequency of the drivetrain. According to the invention, the drivetrain natural frequency is determined based on the current speed ratio of a transmission coupling the drivetrain to the engine, and is used to define the center frequency of a band-pass filter responsive to engine speed. The filter output represents the AC component of the engine speed in a range of frequencies centered on the driveline natural frequency, and such component is differentiated to form an acceleration component in phase synchronism with the torque causing the detected resonance. An electric machine mechanically coupled to the engine is energized in accordance with the inverse of the acceleration component to actively cancel the detected resonance whenever the acceleration component exceeds a noise threshold that also is adjusted based on the estimated natural frequency of the drivetrain.

DESCRIPTION OF THE PREFERRED EMBODIMENT

Figure 1:
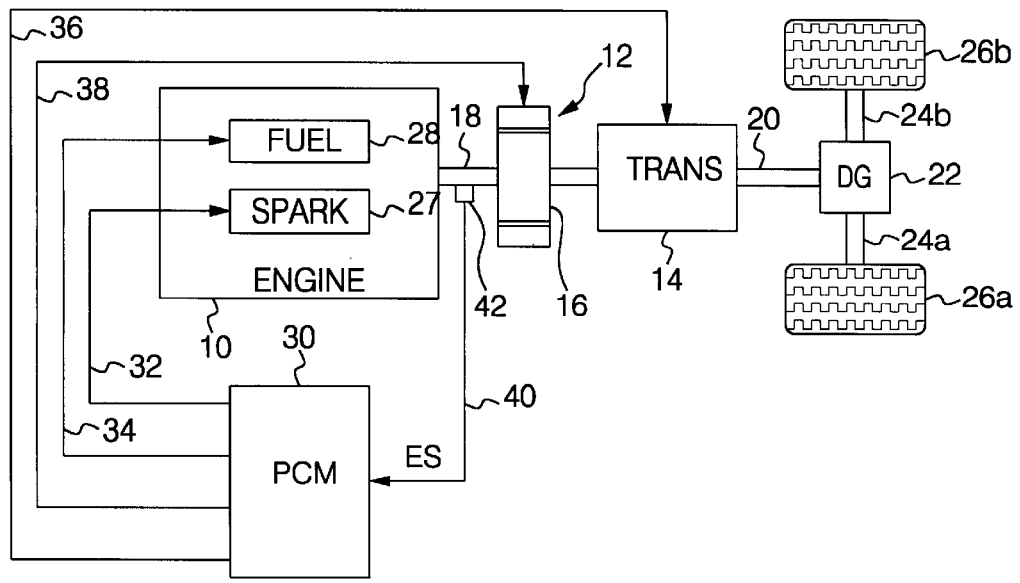
FIG. 1 is a schematic diagram of a parallel hybrid motor vehicle powertrain including an engine, an electrical machine, and a microprocessor-based powertrain control module programmed to carry out the control of this invention.

Referring to the drawings, and particularly to FIG. 1, the control of this invention is illustrated in the context of a parallel hybrid motor vehicle powertrain including an internal combustion engine 10, an electric machine 12, and a multiple speed ratio automatic transmission (TRANS) 14. The rotor 16 of machine 12 is rigidly coupled to the engine output shaft 18 and the transmission input, whereas the drive shaft 20, differential gearset (DG) 22 and the half-shafts 24a, 24b couple the transmission output to a pair of drive wheels/tires 26a, 26b. Engine 10 includes conventional spark and fuel control mechanisms 27, 28 operated under the control of a microprocessor-based powertrain control module (PCM) 30 via lines 32, 34 as indicated. Additionally, PCM 30 controls shifting of transmission 14 via line 36 and energization of electric machine 12 via line 38. As explained below, PCM 30 operates in response to a number of inputs, including an engine speed signal (ES) on line 40, which may be developed by a conventional speed transducer 42.

The PCM 30 carries out a number of conventional powertrain control algorithms and, according to this invention, carries out an additional algorithm for energizing the electric machine 12 in response to a detected oscillation component of the engine speed signal ES for alleviating or suppressing the detected oscillation. As described above, the various powertrain components depicted in FIG. 1 have a certain natural or resonant frequency that varies depending on the design of the constituent components. The shafts 20, 24a, 24b and differential gearset 22, along with axle mounting stiffness to the rigid vehicle structure, exhibit a spring-like characteristic through which the combined inertia of engine 10, electric machine 12 and transmission 14 is coupled to the vehicle inertia via engagement of the wheels 26a, 26b with a road surface. Thus, oscillation of the powertrain and driveline components at this characteristic natural frequency can be excited by torque disturbances due to engine torque irregularities and/or road surface irregularities. While the natural frequency of any given vehicle configuration can be determined (either empirically or by mathematical modeling) and is relatively constant, it varies significantly with the speed ratio of transmission 14 because the combined inertia of engine 10 and machine 12 is reflected to the spring-like components 20, 22, 24a, 24b at a torque ratio corresponding to the transmission speed ratio. Since other factors affecting the driveline natural frequency during vehicle operation are relatively minor compared with the transmission gear ratio (tire wear, for example), the natural frequency may be easily determined and stored in PCM 30 as a function of transmission gear ratio for purposes of detecting the presence of significant oscillation at the natural frequency.

Figure 2:
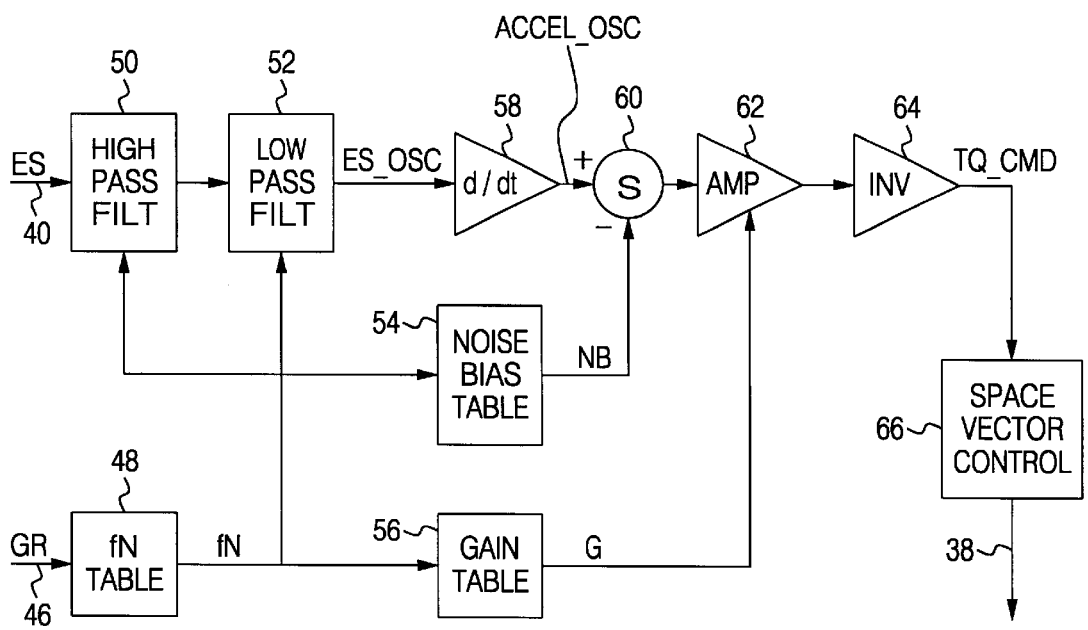
FIG. 2 is a block diagram of the control method carried out by the powertrain control module of FIG. 1.
Figure 3:
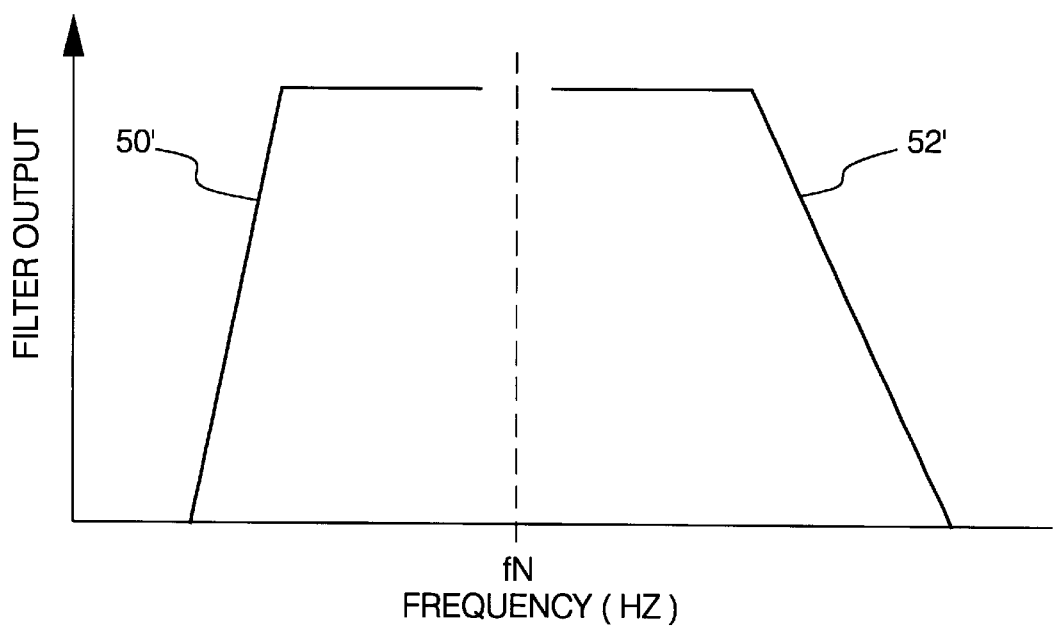
FIG. 3 graphically depicts a sliding mode filter function performed by the powertrain control module of FIG. 1 according to this invention.

The block diagram of FIG. 2 generally illustrates the control method of this invention as carried out by PCM 30. One input not shown in FIG. 1 is the transmission gear ratio GR on line 46; this information is available within PCM 30 since PCM 30 schedules gear ratio shifting of transmission 14, as mentioned above. The gear ratio signal GR is applied as an input to look-up table 48, which outputs a corresponding driveline natural frequency fN based on empirically or mathematically determined data stored in table 48. The engine speed input signal ES is successively applied to a second-order high pass filter 50 and a first-order low pass filter 52, each of which has a frequency roll-off characteristic that changes as a function of the determined natural frequency fN. Referring briefly to FIG. 3, the frequency response of high piss filter 50 is represented by the trace 50', and the frequency response of low pass filter 52 is represented by the trace 52', for a given driveline natural frequency fN. Thus, the filters 50 and 52 together provide a sliding mode band-pass filter function which is tuned to pass AC components of the engine speed signal ES in a predetermined frequency range about the determined driveline natural frequency fN.

In a mechanization of the present invention, the filter function corresponding to block 50 was carried out with a discrete second-order Butterworth filter, and the filter function corresponding to block 52 was carried out with a discrete first-order Butterworth filter. The second-order (high pass) filter equation may be of the form:

$$y(n)=[b(1)*x(n)]+[b(2)*x(n-1)]+[b(3)*x(n-2)]-[a(2)*y(n-1)]-[a(3)*y(n-2)]$$

where y(n), y(n−1) and y(n−2) are output values of the filter for the current, previous and second previous program loops; x(n), x(n−1) and x(n−2) are input values to the filter for the current, previous and second previous program loops; and b(1) , b(2) , b(3) , a(2) and a(3) are coefficients determined by the desired filter frequency and the program loop time. The first-order (low pass) filter equation may be of the form:

$$y(n)=[b(1)*x(n)]+[b(2)*x(n-1)]-[a(2)*y(n-1)]$$

where y(n) and y(n−1) are output values of the filter for the current and previous program loops; x(n) and x(n−1) are input values to the filter for the current and previous program loops; and b(1) , b(2) and a(2) are coefficients determined by the desired filter frequency and the program loop time.

Figure 4:
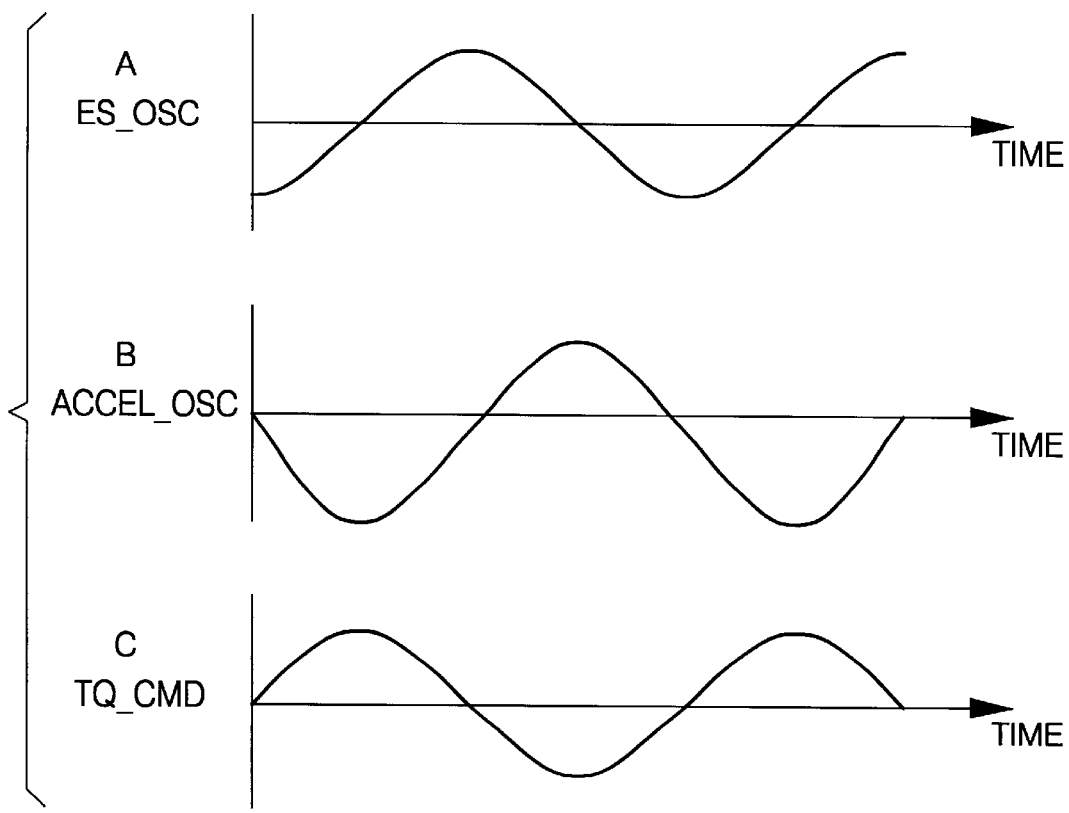
FIG. 4, Graphs A, B and C, depict representative signals occurring at various points of the block diagram of FIG. 2.

The output of low-pass; filter 52, designated ES__OSC, is differentiated by differentiator block 58 to form a corresponding acceleration signal ACCEL__OSC, which is in phase with the oscillating component of the driveline torque. The summing junction 60 compares the acceleration signal ACCEL__OSC with noise bias NB determined by look-up table 54. The noise bias values stored in table 54 are empirically determined to match an observed noise level at various values of the determined driveline natural frequency fN, and only that portion of ACCEL__OSC that exceeds NB is passed on to amplifier 62. This facilitates selective degrees of surge suppression and consequent energy consumption. The gain G of amplifier 62 is determined by the gain table 56, which likewise produces an output that is matched to the determined driveline natural frequency fN. The output of amplifier 62 is then inverted by inverter 64 to form a torque command TQ__CMD signal that is 180° out of phase with ACCEL__OSC. Referring briefly to FIG. 4, Graphs A, B and C respectively depict representative values of ES__OSC, ACCEL__OSC and TQ__CMD for an oscillatory driveline condition. Thus, the ES__OSC signal of Graph A represents the oscillatory component of engine speed ES in a predetermined range of frequencies about fN, the ACCEL__OSC signal of Graph B represents the corresponding driveline acceleration, and the TQ__CMD signal of Graph C represents a corrective torque to be exerted by electric machine 12 for suppressing the detected driveline oscillation. It will be noted that the acceleration signal ACCEL__OSC leads the engine speed oscillation signal ES__OSC by 90°, and that the torque command signal TQ__CMD is 180° out of phase with the acceleration signal ACCEL__OSC. Finally, referring again to FIG. 2, the torque command signal TQ__CMD is applied as an input to the space vector control block 66, which represents a conventional motor/generator control function for energizing the windings of electric machine 12 via line 38 for producing the commanded torque to oppose the detected speed oscillation.

In summary, the control of this invention determines the natural frequency of a motor vehicle driveline, and detects and suppresses detected driveline oscillation in a frequency range centered on the determined driveline natural frequency. While described in reference to the illustrated embodiment, it is expected that various modifications in addition to those mentioned above will occur to those skilled in the art. For example, the noise bias may be applied to the speed oscillation signal ES__OSC instead of the acceleration oscillation signal ACCEL__OSC, the high-pass and low-pass filters 50, 52 may be reversed or replaced with a band-pass filter, and so on. Additionally, the control of this invention is equally applicable to other drivetrain configurations and transmission types. For example, transmission 14 may be a manual transmission, or a continuously variable speed ratio transmission (CVT). In this regard, it will be understood that the scope of this invention is not limited to the illustrated embodiment, and that control methods incorporating such modifications may fall within the scope of this invention, which is defined by the appended claims.

What is claimed is:

1. A surge suppression control method for a motor vehicle powertrain including an engine coupled to a driveline through an electric machine and a multiple speed ratio transmission, the control method comprising the steps of:

measuring a rotary speed of said engine;

determining a natural resonant frequency of said driveline based on a current speed ratio of said transmission;

filtering the measured rotary speed based on the determined natural resonant frequency to produce a speed oscillation signal representing an oscillatory component of the measured rotary speed in a predetermined range of frequencies substantially centered on said determined natural resonant frequency;

differentiating said speed oscillation signal to form a corresponding acceleration oscillation signal; and inverting said acceleration oscillation signal to form a torque command for said electric machine.

2. The surge suppression control method of claim 1, including the steps of:

determining a noise bias signal based on said determined natural resonant frequency; and reducing one of said speed oscillation and acceleration oscillation signals by said noise bias signal prior to the step of inverting said acceleration oscillation signal to form said torque command.

3. The surge suppression control method of claim 1, including the steps of:

determining a control gain based on said determined natural resonant frequency; and amplifying said acceleration oscillation signal in accordance with the determined control gain prior to the step of inverting said acceleration oscillation signal to form said torque command.

4. The surge suppression control method of claim 1, wherein the step of filtering the measured rotary speed includes the step of:

successively high pass filtering and low pass filtering the measured rotary speed.

5. The surge suppression control method of claim 1, wherein the step of filtering the measured rotary speed includes the step of:

band pass filtering the measured rotary speed.

* * * * *